United States Patent
Talarico et al.

(10) Patent No.: US 12,069,742 B2
(45) Date of Patent: Aug. 20, 2024

(54) ENABLING INITIATING DEVICE FOR UEs OPERATING IN INACTIVE MODE FOR URLLC OPERATING IN UNLICENSED SPECTRUM

(71) Applicant: Intel Corporation, Santa Clara, CA (US)

(72) Inventors: Salvatore Talarico, Los Gatos, CA (US); Sergey Panteleev, Nizhny Novgorod (RU); Debdeep Chatterjee, San Jose, CA (US); Toufiqul Islam, Santa Clara, CA (US); Seau S. Lim, Swindon (GB)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 17/500,694

(22) Filed: Oct. 13, 2021

(65) Prior Publication Data

US 2022/0110168 A1    Apr. 7, 2022

Related U.S. Application Data

(60) Provisional application No. 63/121,775, filed on Dec. 4, 2020, provisional application No. 63/093,018, filed on Oct. 16, 2020.

(51) Int. Cl.
| | |
|---|---|
| *H04W 74/0833* | (2024.01) |
| *H04L 1/1812* | (2023.01) |
| *H04W 72/23* | (2023.01) |
| *H04W 74/00* | (2009.01) |

(52) U.S. Cl.
CPC ....... *H04W 74/0841* (2013.01); *H04L 1/1812* (2013.01); *H04W 72/23* (2023.01); *H04W 74/004* (2013.01)

(58) Field of Classification Search
None
See application file for complete search history.

(56) References Cited

U.S. PATENT DOCUMENTS

| | | | | |
|---|---|---|---|---|
| 11,824,662 | B2 * | 11/2023 | Kung | H04L 5/0005 |
| 11,844,135 | B2 * | 12/2023 | Sha | H04W 72/23 |
| 2020/0396767 | A1 * | 12/2020 | Talarico | H04W 74/0808 |
| 2021/0022179 | A1 * | 1/2021 | Sun | H04W 74/085 |
| 2021/0195643 | A1 * | 6/2021 | Talarico | H04W 74/0816 |
| 2021/0307083 | A1 * | 9/2021 | Wu | H04W 74/0816 |
| 2021/0360421 | A1 * | 11/2021 | Wang | H04W 16/14 |
| 2022/0191849 | A1 * | 6/2022 | Yoon | H04W 72/044 |
| 2023/0107215 | A1 * | 4/2023 | Kumagai | H04W 74/0875 370/329 |
| 2023/0180293 | A1 * | 6/2023 | Calcev | H04W 16/14 370/328 |

(Continued)

*Primary Examiner* — Otis L Thompson, Jr.
(74) *Attorney, Agent, or Firm* — Schwegman Lundberg & Woessner, P.A.

(57) ABSTRACT

An apparatus and system to permit a UE idle or inactive mode to operate as an URLLC initiating device operating in a shared spectrum in a PRACH procedure are described. The UE receives a gNB control signal that contains an indication that the UE is able to operate as an initiating device and in response transmits a physical random access channel (PRACH) message within a Fixed Frame Period (FFP) of the UE. Transmission of the PRACH message is contingent on non-overlap of the PRACH message transmission with the idle period of a gNB FFP.

19 Claims, 11 Drawing Sheets

(56) References Cited

U.S. PATENT DOCUMENTS

| | | | |
|---|---|---|---|
| 2023/0189338 A1* | 6/2023 | Singh | H04W 74/0816 370/329 |
| 2023/0284265 A1* | 9/2023 | Rosa | H04L 5/0048 370/336 |
| 2023/0345539 A1* | 10/2023 | Yang | H04W 74/0833 |
| 2023/0379092 A1* | 11/2023 | Chin | H04W 72/232 |

* cited by examiner

FIG. 3

| R | Device type | Timing Advance Command | UL Grant | UL Grant | UL Grant | UL Grant | Temporary C-RNTI | Temporary C-RNTI |
|---|---|---|---|---|---|---|---|---|
| | | Timing Advance Command | | | | | | |

Oct 1 | Oct 2 | Oct 3 | Oct 4 | Oct 5 | Oct 6 | Oct 7

FIG. 4

| | | | | | | | | | | |
|---|---|---|---|---|---|---|---|---|---|---|
| UE Contention Resolution Identity | UE Contention Resolution Identity | UE Contention Resolution Identity | UE Contention Resolution Identity | UE Contention Resolution Identity | UE Contention Resolution Identity | R / Channel Access-CPext / TPC / HARQ Feedback Timing Indicator | PUCCH Resource Indicator / Timing Advance Command | Timing Advance Command | C-RNTI | C-RNTI |
| Oct 1 | Oct 2 | Oct 3 | Oct 4 | Oct 5 | Oct 6 | Oct 7 | Oct 8 | Oct 9 | Oct 10 | Oct 11 |

ENABLING INITIATING DEVICE FOR UEs OPERATING IN INACTIVE MODE FOR URLLC OPERATING IN UNLICENSED SPECTRUM

PRIORITY CLAIM

This application claims the benefit of priority to U.S. Provisional Patent Application Ser. No. 63/093,018, filed Oct. 16, 2020, and U.S. Provisional Patent Application Ser. No. 63/121,775, filed Dec. 4, 2020, each of which is incorporated herein by reference in its entirety.

TECHNICAL FIELD

Embodiments pertain to next generation wireless communications. In particular, some embodiments relate to a repetition scheme for physical uplink shared channel (PUSCH) in 5G networks.

BACKGROUND

The use and complexity of wireless systems, which include $5^{th}$ generation (5G) networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3 illustrates a modified medium access control (MAC) Random Access Response (RAR) in accordance with some aspects.

FIG. 4 illustrates another modified MAC RAR in accordance with some aspects.

FIG. 5 illustrates a modified MAC SucessRAR in accordance with some aspects.

FIG. 6 illustrates another modified MAC SucessRAR in accordance with some aspects.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
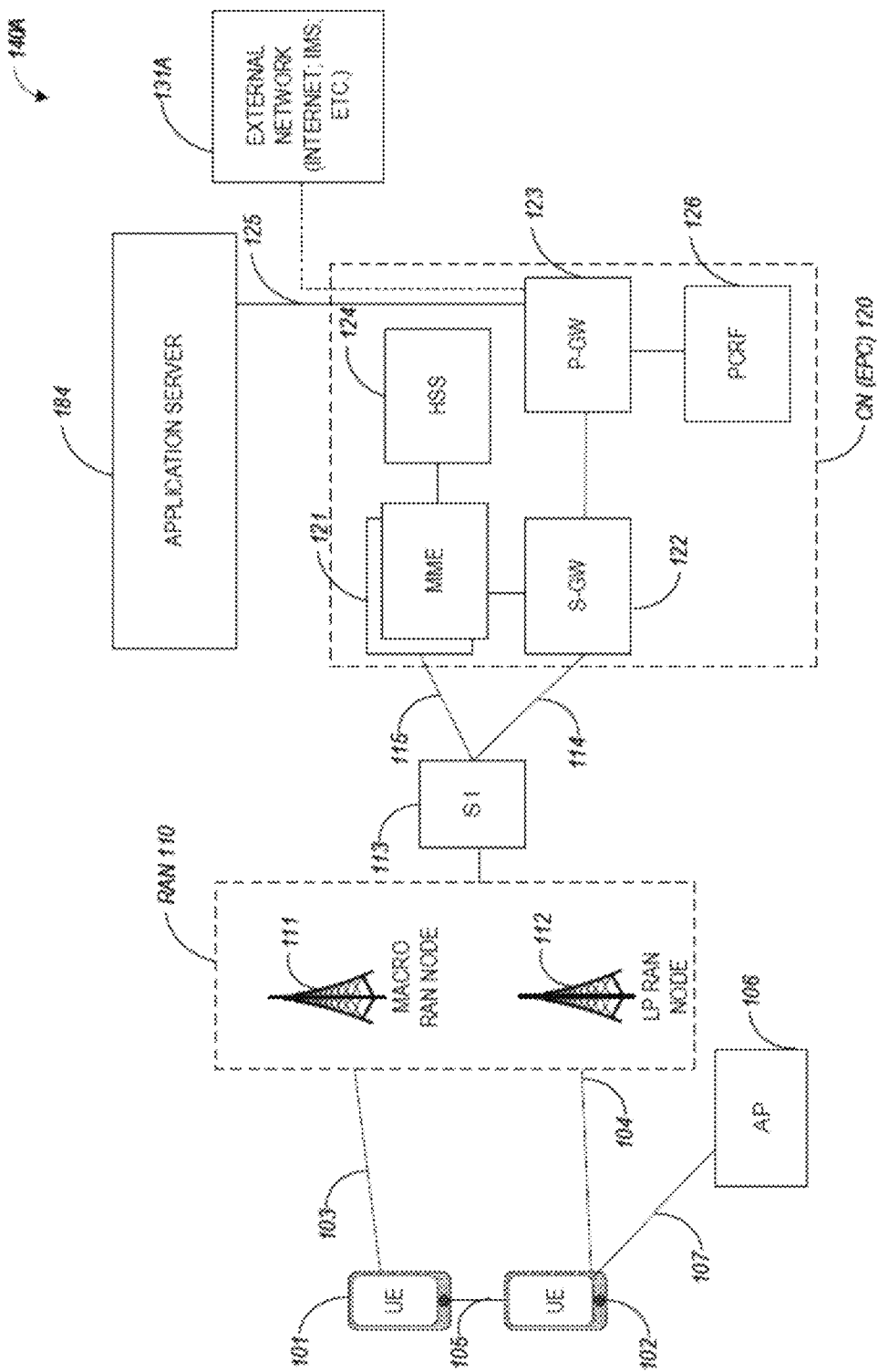
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below), in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet. IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
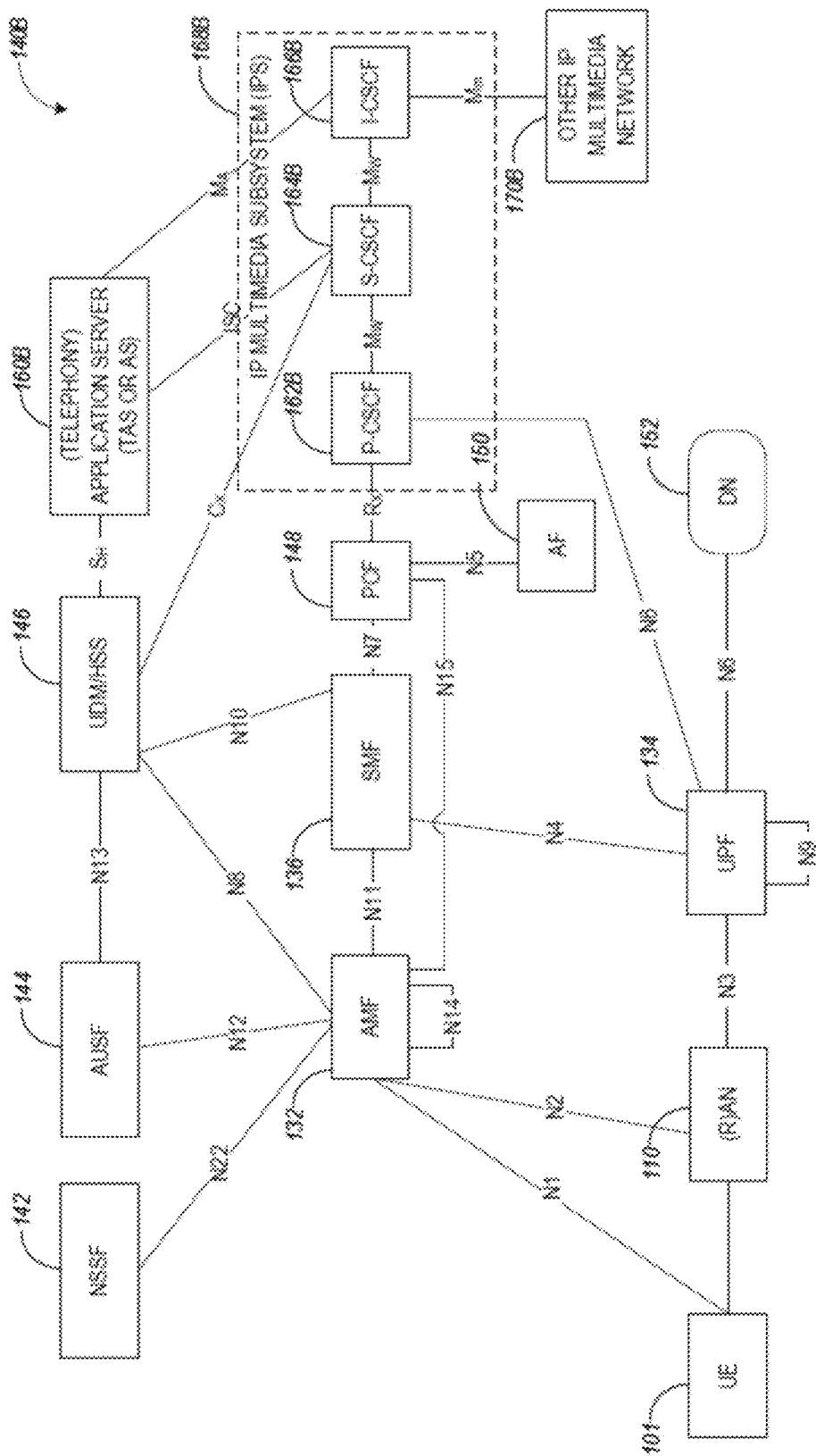
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
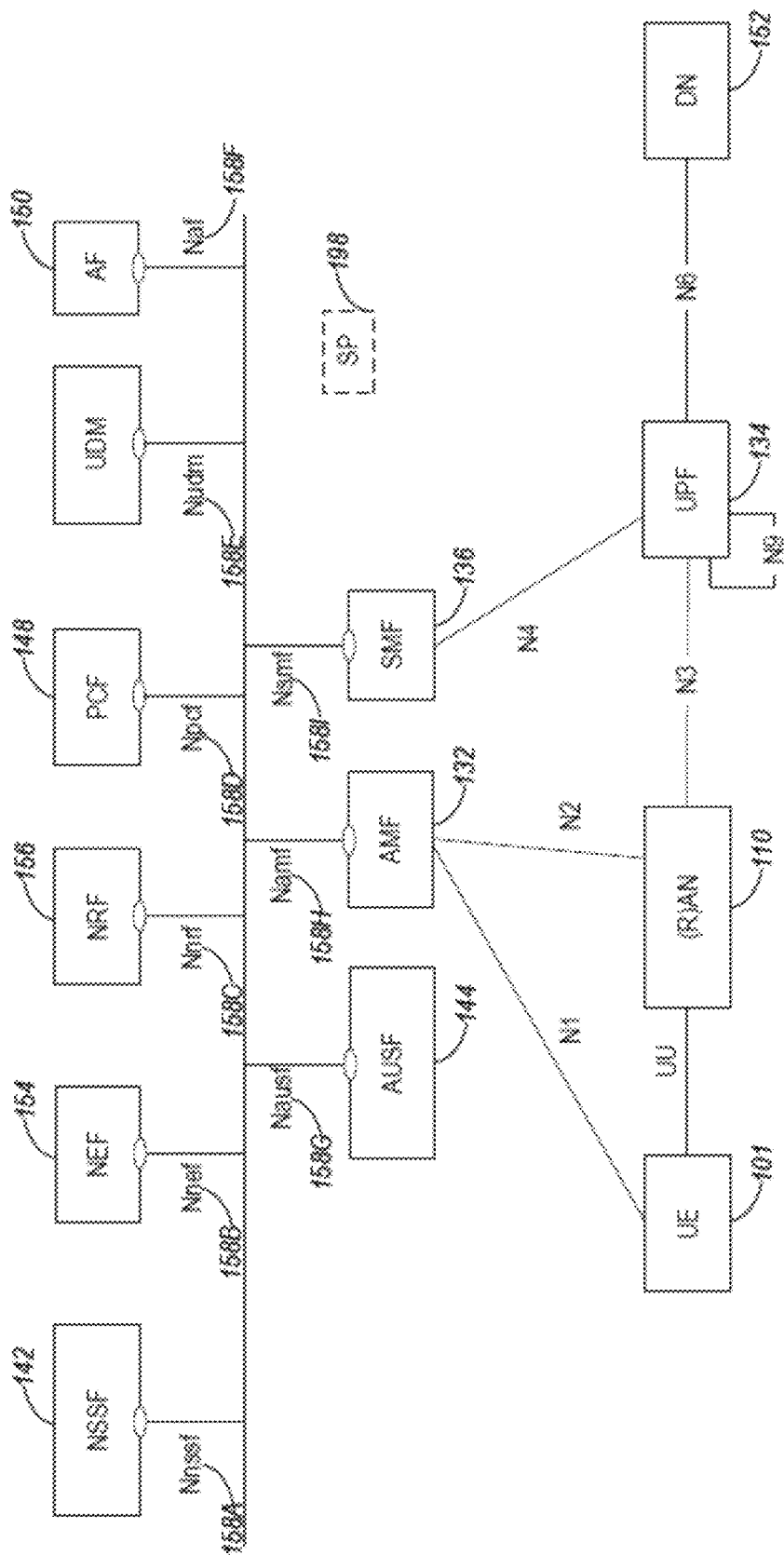
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points N1 or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
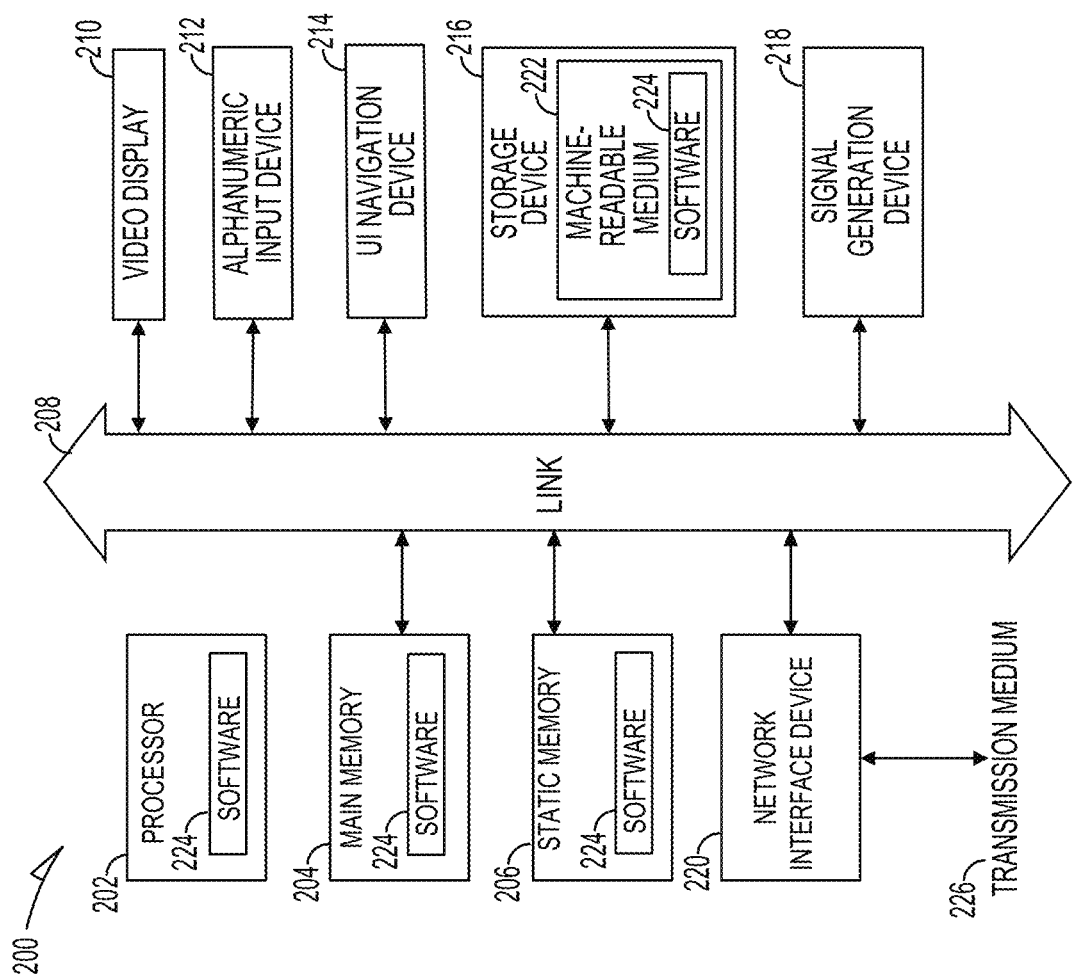
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks: Random Access Memory (RAM): and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks. Communications over the networks may include one or more different protocols, such as Institute of Electrical and Electronics Engineers (IEEE) 802.11 family of standards known as Wi-Fi. IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 200 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 50, 50, 5G New Radio (5G NR), 3GPP 50 New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)). Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony). High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905

GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz. and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, the achievable latency and reliability performance of 5G systems is to be improved to support use cases with tighter requirements. Rel-16 NR evolved to support use cases, including the following: Release 15 enabled use case improvements, AR/VR (Entertainment industry), NR 16 use cases with higher requirements, factory automation, transport industry, and electrical power distribution. However, in some of the scenarios, one of the major limiting factors is still the availability of spectrum. To mitigate this, one of the objectives of Rel. 17 is to identify potential enhancements to ensure Release 16 feature compatibility with unlicensed band Ultra-Reliable Low-Latency Communication (URLLC)/industrial internet of things (IIoT) operation in controlled environment.

It is thus desired to identify aspects of the design that can be enhanced when operating in unlicensed spectrum. One of the challenges is that the system is to comply with the regulatory requirements dictated for the sub-6 GHz band, where a listen before talk (LBT) procedure is performed in some parts of the world to acquire the medium before a transmission can occur as described in ETSI EN 301 893, while still being able to guarantee the requirements in terms of reliability and latency identified for the design of URLLC/IIoT to meet the aforementioned use cases. Additional design considerations are to be therefore made in these regards. In fact, w % ben operating URLLC/IIoT in the unlicensed spectrum, due to the LBT procedure and its aleatory nature, additional latency and loss in reliability may be introduced depending on the medium contention when the LBT fails.

While during the Rel 16 NR-U WI, the load-based design or semi-static channel access design has been made so that to accommodate for different scenanos and the use of the LBT procedure, only the gNB is allowed to perform as an initiating device. However, for Rel.17 URLLC/IIoT operation in the sub-6 GHz band, it is beneficial to enable the UE to operate also as an initiating device to be able to combat latency issues. This arises when the gNB is not able to acquire a specific Fixed Frame Period (FFP) and mandates a UE from postponing an UL transmission at least to the next FFP. The next FFP may be as long as 10 ms.

In NR, a device in idle/inactive state accesses the network (typically during connection set-up) through a series of functions/procedures commonly known as a random access process. NR uses a 4-step random access procedure for contention-based random access (CBRA) and a 2-step random access procedure for contention free random access (CFRA). For CBRA, the random access procedure includes the following steps:

Step 1 (Msg1 transmission): the device transmits a preamble, also known as physical random access channel (PRACH).

Step 2 (Msg2 transmission): the network transmits a random access response (RAR) message indicating reception of the preamble and providing a timing alignment command (based on the timing of the received preamble) for the device to adjust its transmission timing.

Step 3 (Msg3 transmission): the device transmits an uplink radio resource control (RRC) connection request based on the uplink (UL) grant provided by the RAR.

Step 4 (Msg4 transmission): the network transmits contention resolution in a downlink (DL) message, to resolve any potential collision due to simultaneous transmission of the same preamble from multiple devices within the cell. If successful, message 4 also transfers the device to the connected state.

As for CFRA, the random procedure contains only MsgA and MsgB, whiere the contention is resolved by the exchange of the first two messages.

As mentioned above, in Rel. 16 when operating in shared spectrum within the sub-6 GHz band, a UE is not allowed to transmit MsgA for CFRA, and Msg1 or Msg3 for CFRA as an initiating device, can only transmit those messages within a gNB's FFP, and any transmission occasions that overlap with the idle period of a gNB's FFP would considered invalid and the UE would not be able to transmit.

However, as highlighted above for URLLC operating in the shared spectrum, it is beneficial from a latency perspective to enable a UE to operate as an initiating device and acquire its own FFP instead of waiting until the gNB would do so. In order to enable a UE from operating as an initiating device, modifications may be used within the current design.

Enabling UE's Initiating Device for PRACH Transmissions During Random Access Process Over Unlicensed Spectrum According to Rel-16 specifications, when a UE is provided with ChannelAccessMode-r16='semistatic' by SIB1 or dedicated configuration, a UE is not allowed to start a transmission of its FFP and operate as an initiating device when in RRC_IDLE or RRC_INACTIVE mode. A UE can only transmit PRACH within an FFP, which has been successfully acquired by a gNB by succeeding in the CAT-2 LBT procedure described in TS 37.213 in Sec. 4.3. However, a PRACH resource would be considered invalid, and the UE is not allowed to transmit, if the PRACH transmission would overlap within the idle period of a gNB's FFP.

In some embodiments, when a UE is provided with ChannelAccessMode-r16='semistatic' by SIB1 or a dedicated configuration by higher layer RRC signaling, a UE is allowed to start transmission of msg1 and/or msgA within its own FFP and operate as an initiating device. However, this would be possible only if the msg1 and/or msgA transmission does not overlap with the idle period of a gNB's FFP.

Alternatively, the UE may be allowed to start transmission within its own FFP and operate as an initiating device if the msg1 and/or msgA transmission do not overlap with the idle period of a gNB's FFP, and, in addition, only within an invalid gNB's FFP, for which the gNB has not been able to succeed in the Cat-2 LBT to initiate that FFP. In this case, the UE may assess whether a gNB's FFP is or is not valid, by performing blind presence detection within one or multiple instances of time within a gNB's FFP, before the UE decides whether to operate as an initiating device and start its own FFP—or whether to operate as a responding device. Alternatively, it is possible to perform a msg1 and/or msgA transmission as if a UE would be the initiating device, if the transmission lies within the gNB's idle period but does not overlap with its last 16 or 25 µs, which are used by the gNB to acquire the following gNB's FFP, and/or if the transmission lies outside of the idle period of that UE.

In some embodiments, when a UE is provided with ChannelAccessMode-r16 'semistatic' by SIB1 or a dedicated configuration by higher layer RRC signaling, a UE is allowed to start transmission of msg3 within its own FFP and operate as an initiating device. However, this may occur only if one of the following conditions are met:

The msg3 transmission does not overlap with the idle period of a gNB's FFP;

The msg3 transmission does not overlap with the idle period of a gNB's FFP and the gNB provides explicit indication about this within the RAR.

The msg3 transmission does not overlap with the idle period of a gNB's FFP, and the transmission occurs within an invalid gNB's FFP.

The msg3 transmission does not overlap with the idle period of a gNB's FFP, the transmission occurs within an invalid gNB's FFP, and the gNB provides explicit indication about this within the RAR.

In addition, an RRC parameter such as 'allowDeviceType-r17' can be introduced and may be provided to a UE via System Information Block (SIB) signaling or dedicated RRC signaling. In this case, both ChannelAccessMode-r16='semistatic' and 'allowDeviceTypeInRar-r17'='true' should be fulfilled for the UE to follow one of the procedures described above.

In some embodiments, when a UE is provided with ChannelAccessMode-r16='semistatic' by SIB1 or a dedicated configuration by higher layer RRC signaling, if the gNB receives a PRACH transmission from a UE, the gNB first performs a cat-2 LBT procedure and sends Msg2 (Random Access Response or RAR) to UE(s) and indicates whether within the FFP over which msg3 is scheduled a UE is or is not allowed to operate as an initiating device. Upon reception of msg2, the UE may determine whether the UE is able to operate as an initiating or responding device when transmitting msg3. Based on this information, the UE may transmit msg3 upon performing the cat-2 LBT procedure and initiating its own FFP or within the FFP of the gNB's, as in Rel.16.

In some embodiments, the gNB can indicate, via an RAR UL grant field, whether or not a UE is able to operate as an initiating device when initiating a msg3 transmission. In particular, the gNB can provide an indication of whether or not within the FFP over which msg3 is scheduled a UE is allowed to operate as an initiating device without increasing the number of bits in the RAR UL grant by using some of the unused bits or by repurposing one or more of the existing fields which are left unused.

As one example, the "CSI request" field that is reserved in Rel-16 NR specification (Table 8.2-1 of 3GPP TS 38.213) can be repurposed to indicate whether or not a UE is able to operate as an initiating device when transmitting Msg3. In this case, bit 0 may indicate that the UE is able to operate as an initiating device and bit "1" may indicate that the UE cannot operate as an initiating device (or vice versa) and the field name can be "Device type". When the indication indicates that the UE is able to operate as an initiating device, this implies that the UE is able to perform the Cat-2 LBT procedure to acquire the channel occupancy time (COT) independently of the information provided within the RAR UL grant in the field ChannelAccess-CPext. If the Cat-2 LBT procedure succeeds, the UE is then able to share the COT within its acquired FFP.

Table 8.2-1 of 3GPP TS 38.213 can be modified to include the "Device type" as follows:

TABLE 1

Modified RAR Grant Content Field

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 0, for operation with shared spectrum channel access when ChannelAccessMode-r16 = 'semistatic'<br>1, Otherwise |
| Device type | 1, for operation with shared spectrum channel access when ChannelAccessMode-r16 = 'semistatic'<br>0, Otherwise |
| ChannelAccess-CPext | 0, for operation without shared spectrum channel access<br>2, for operation with shared spectrum channel access |

In addition, in the above example, the re-interpretation of one field (e.g., 'CSI request') or multiple fields of the RAR grant may be enabled or disabled by an RRC message provided by SIB1 or dedicated signaling. Specifically, an RRC parameter such as 'allowDeviceTypeInRar-r17' can be introduced. In this case, the RAR grant field is re-interpreted when both ChannelAccessMode-r16='semistatic' and 'allowDeviceTypeInRar-r17'='true' are indicated.

As another example, the RAR grant field "Frequency hopping flag" can be repurposed to indicate whether or not a UE is able to operate as an initiating device when transmitting Msg3, and that frequency hopping is disabled for Msg3. Due to regulatory requirements in terms of occupied channel bandwidth (OCB) for the usage of unlicensed spectrum, an Msg3 PUSCH transmission may be based on a distributed frequency allocation (e.g., interlace based) and hence frequency hopping may be avoided (on top of an interlaced PUSCH) for frequency diversity. The "Frequency hopping flag" field in Rel-16 NR specification (Table 8.2-1 of 3GPP TS 38.213) can be repurposed as "Device type." In this case, bit '0' may indicate that the UE is able to operate as an initiating device and bit "1" may indicate that the UE cannot operate as an initiating device (or vice versa).

Table 8.2-1 of 3GPP TS 38.213 can be modified to include indication of whether a UE is able to operate as an initiating device or not when transmitting Msg3 by including the field "Device type" as follows:

In addition, in the above example, the re-interpretation of one field (e.g., 'Frequency hopping flag') or multiple fields of the RAR grant may be enabled or disabled by an RRC message provided by SIB1 or dedicated signaling. Specifically, an RRC parameter such as 'allowDeviceTypeInRar-r17' can be introduced. In this case, the RAR grant field may be re-interpreted when both ChannelAccessMode-r16='semistatic' and 'allowDeviceTypeInRar-r17'='true' are indicated.

As another example, when ChannelAccessMode-r16='semistatic', any other RAR grant field (e.g. "PUSCH time resource allocation" or "MCS" or "TPC command for PUSCH") may be modified to extract 1-2 bits and repurpose these bits to indicate whether a UE can or cannot operate as an initiating device when transmitting Msg3.

As another example, when ChannelAccessMode-r16='semistatic', the reserved bits of "MCS" can be repurposed to indicate whether a UE is able to operate as an initiating device or not when transmitting Msg3. For example, $I_{MCS}$=28/29/30 or 31 may indicate that a UE is able to operate as an initiating device.

In another option, when ChannelAccessMode-r16='semistatic', the gNB can indicate whether or not a UE is able to operate as an initiating device when initiating a Msg3 transmission via the RAR UL grant field by introducing a new RAR grant field bits in Table 8.2-1 of 3GPP TS 38.213, thereby increasing number of bits in RAR UL grant (e.g., 27 bits in Rel-16 NR) by 1 bit. The new field can be

TABLE 2

Modified RAR Grant Content Field

| RAR grant field | Number of bits |
| --- | --- |
| Frequency hopping flag | 0, for operation with shared spectrum channel access when ChannelAccessMode-r16 = 'semistatic'<br>1, Otherwise. |
| Device type | 1, for operation with shared spectrum channel access when ChannelAccessMode-r16 = 'semistatic'<br>0, Otherwise |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access | introduced either at the beginning of the table (i.e., the MSB bit), or at the end of the table (i.e., the LSB bit) or anywhere in the middle of the table.

is indicated through the 1-bit reserved field of the MAC RAR payload, as shown in FIG. 6.2.3-1 of 3GPP TS 38.321. Currently, the first bit of the first octet in octet aligned MAC

TABLE 3-1

Enhanced RAR Grant Content Field (introducing additional bit as "MSB")

| RAR grant field | Number of bits |
|---|---|
| Device type | 1, for operation with shared spectrum channel access when ChannelAccessMode-r16 = 'semistatic' 0, Otherwise |
| Frequency hopping flag | 1 |
| PUSCH frequency resource allocation | 14, for operation without shared spectrum channel access 12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access 2, for operation with shared spectrum channel access |

TABLE 3-2

Enhanced RAR Grant Content Field (introducing additional bit as "LSB")

| RAR grant field | Number of bits |
|---|---|
| Frequency hopping flag | 1 |
| PUSCH frequency resource allocation | 14, for operation without shared spectrum channel access 12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access 2, for operation with shared spectrum channel access |
| Device type | 1, for operation with shared spectrum channel access when ChannelAccessMode-r16 = 'semistatic' 0, Otherwise |

TABLE 3-3

Enhanced RAR Grant Content Field (introducing additional bit in intermediate bit position)

| RAR grant field | Number of bits |
|---|---|
| Frequency hopping flag | 1 |
| PUSCH frequency resource allocation | 14, for operation without shared spectrum channel access 12, for operation with shared spectrum channel access |
| PUSCH time resource allocation | 4 |
| Device type | 1, for operation with shared spectrum channel access when ChannelAccessMode-r16 = 'semistatic' 0, Otherwise |
| MCS | 4 |
| TPC command for PUSCH | 3 |
| CSI request | 1 |
| ChannelAccess-CPext | 0, for operation without shared spectrum channel access 2, for operation with shared spectrum channel access |

In addition, in the above examples, the addition of a new field to the RAR grant may be enabled or disabled by an RRC message provided by SIB1 or dedicated signaling. Specifically, an RRC parameter such as 'allowDeviceTypeInRar-r17' can be introduced. In this case, for a UE to add more bits to the payload of the RAR grant both ChannelAccessMode-r16='semistatic' and 'allowDeviceTypeInRar-r17'='true' may be indicated.

Figure 3:
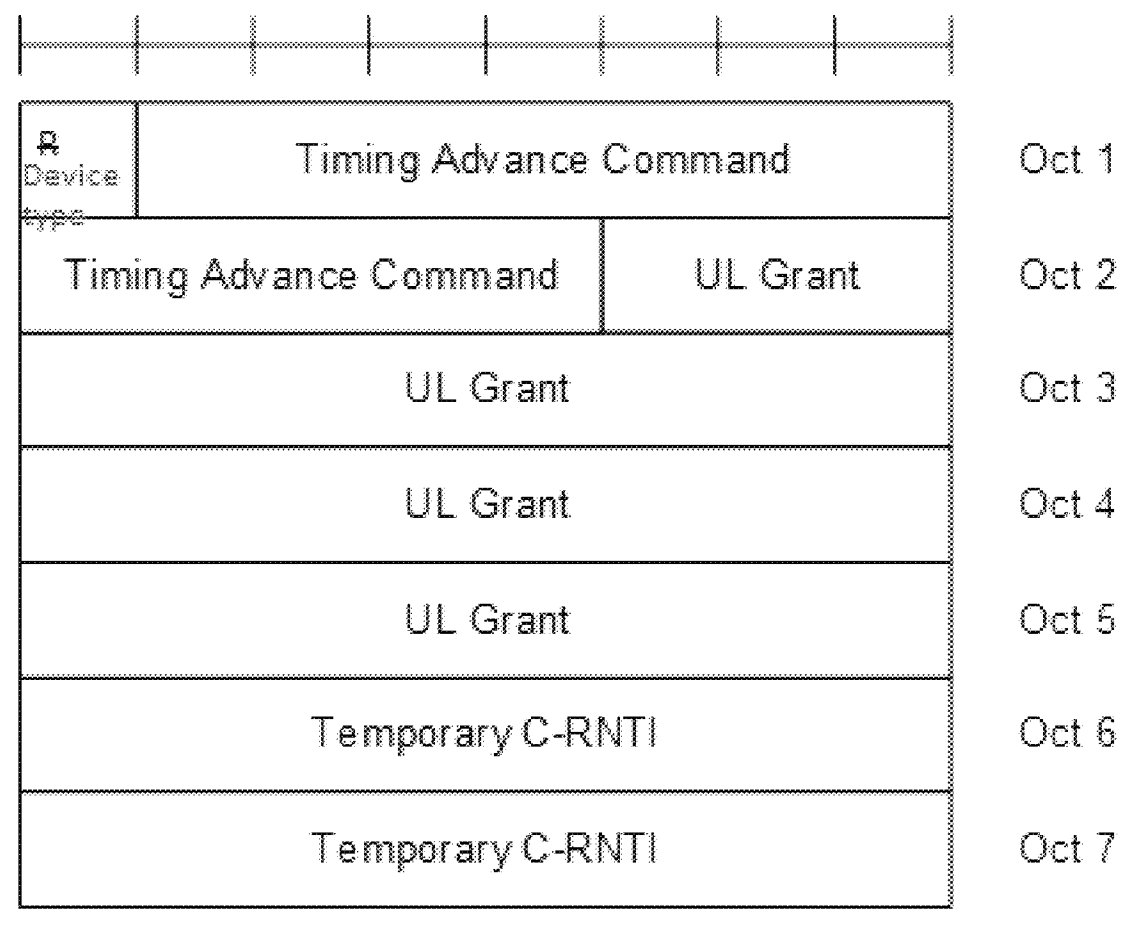

In another option, when ChannelAccessMode-r16='semistatic', instead of changing the content of the RAR UL grant field, whether a UE or not is able to operate as an initiating device when initiating a Msg3 transmission is always assigned bit "0". However, as mentioned above this first bit may be used to indicate to the UE whether or not the UE is able to operate as an initiating device when initiating a Msg3 transmission. In this case, the reserved bit may be repurposed as "Device type" and bit '0' may indicate that UE is able to operate as an initiating device and bit "1" may indicate that UE is not able to operate as an initiating device (or vice versa). FIG. 3 illustrates a modified MAC RAR in accordance with some aspects. In FIG. 3, the modified MAC RAR has a reserved field "R" reassigned as "Device type"

In another option, when ChannelAccessMode-r16='semistatic', whether or not a UE is able to operate as an initiating device when initiating a Msg3 transmission is indicated through 1 bit using a part of the "timing advanced command". In this case, the bit for "timing advanced command" may be repurposed as "Device type" and bit '0' may indicate that UE is able to operate as an initiating device and bit "1" may indicate that UE is not able to operate as an initiating device (or vice versa). FIG. 4 illustrates another modified MAC RAR in accordance with some aspects. FIG. 4 shows a modified MAC RAR with one bit of the field "Timing advance commend"" reassigned as "Device type". In this case, the total number of bits for "timing advanced command" is reduced from 12 to 11 bits. This is based on the assumption that a URLLC operating in the unlicensed spectrum may not be undertaken for a very large cell scenario and a large TA may thus not be used.

The embodiments/options above are not mutually exclusive, and one or more of them may apply together.

In one embodiment, when a UE is provided with ChanneAccessMode-r16בemistatic' by SIB1 or a dedicated configuration by higher layer RRC signaling, for a 2-step RACH process, a UE is allowed to start transmission of the Hybrid Automatic Repeat Request (HARQ)-feedback information related to the MsgB transmission within its own FFP, and operate as an initiating device. In this case, if the gNB receives MsgA from a UE, the gNB first performs the cat-2 LBT procedure, sends MsgB to the UE(s), and indicates whether or not a UE is allowed to operate as an initiating device within the FFP over which the HARQ-ACK feedback information related to MsgB is scheduled to be transmitted. Upon reception of MsgB, the UE may determine whether it is able to operate as an initiating or responding device when transmitting the HARQ-ACK feedback information related to MsgB. Based on this information, the UE may transmit upon performing the Cat-2 procedure and initiating its own FFP or within the FFP of the gNB's as in Rel.16.

In another option, when ChannelAccessMode-r16='semistatic' whether or not a UE is able to operate as an initiating device when transmitting HARQ-ACK information of MsgB for a 2-step RACH procedure is indicated through the 1-bit reserved field of the MAC successRAR payload, as shown in FIG. 6.2.3a-2 of 3GPP TS 38.321. Currently, the first bit of the seventh octet in octet aligned MAC successRAR is always assigned bit "0". However, this bit may be used to indicate to the UE whether or not the UE is able to operate as an initiating device when transmitting the HARQ-ACK feedback information related to MsgB. In this case the reserved bit could be repurposed as "Device type" and bit "0" may indicate that UE is able to operate as an initiating device and bit "1" may indicate that UE is not able to operate as an initiating device (or vice versa). FIG. 5 illustrates a modified MAC SucessRAR in accordance with some aspects. In particular, FIG. 5 illustrates a modified MAC SuccessRAR for 2-step RACH with reserved field "R" reassigned as "Device type". For this option, when the gNB indicates that a device is able to operate as an initiating device, the content of the field ChannelAccess-CPext can be ignored, since the UE is mandated to perform the Cat-2 LBT procedure before acquiring its own FFP.

In another option, when Channel AccessMode-r16='semistatic', whether or not a UE is able to operate as an initiating device when transmitting HARQ-ACK information of MsgB is indicated through the 1-bit reserved field of the MAC fallbackRAR payload, as shown in FIG. 6.2.3a-1 of 3GPP TS 38.321. Currently, the first bit of the first octet in octet aligned MAC RAR is always assigned bit "0". However, as mentioned above, this bit could be used to indicate to the UE whether or not the UE is able to operate as an initiating device when transmitting the HARQ-ACK information of MsgB for the 2-step RACH procedure. In this case, the reserved bit may be repurposed as "Device type" and bit '0' may indicate that UE is able to operate as an initiating device and bit "1" may indicate that UE is not able to operate as an initiating device (or vice versa). FIG. 6 illustrates another modified MAC SucessRAR in accordance with some aspects. FIG. 6 illustrates another modified MAC fallbackRAR for 2-step RACH with reserved field "R" reassigned as "Device type"

Figure 7:
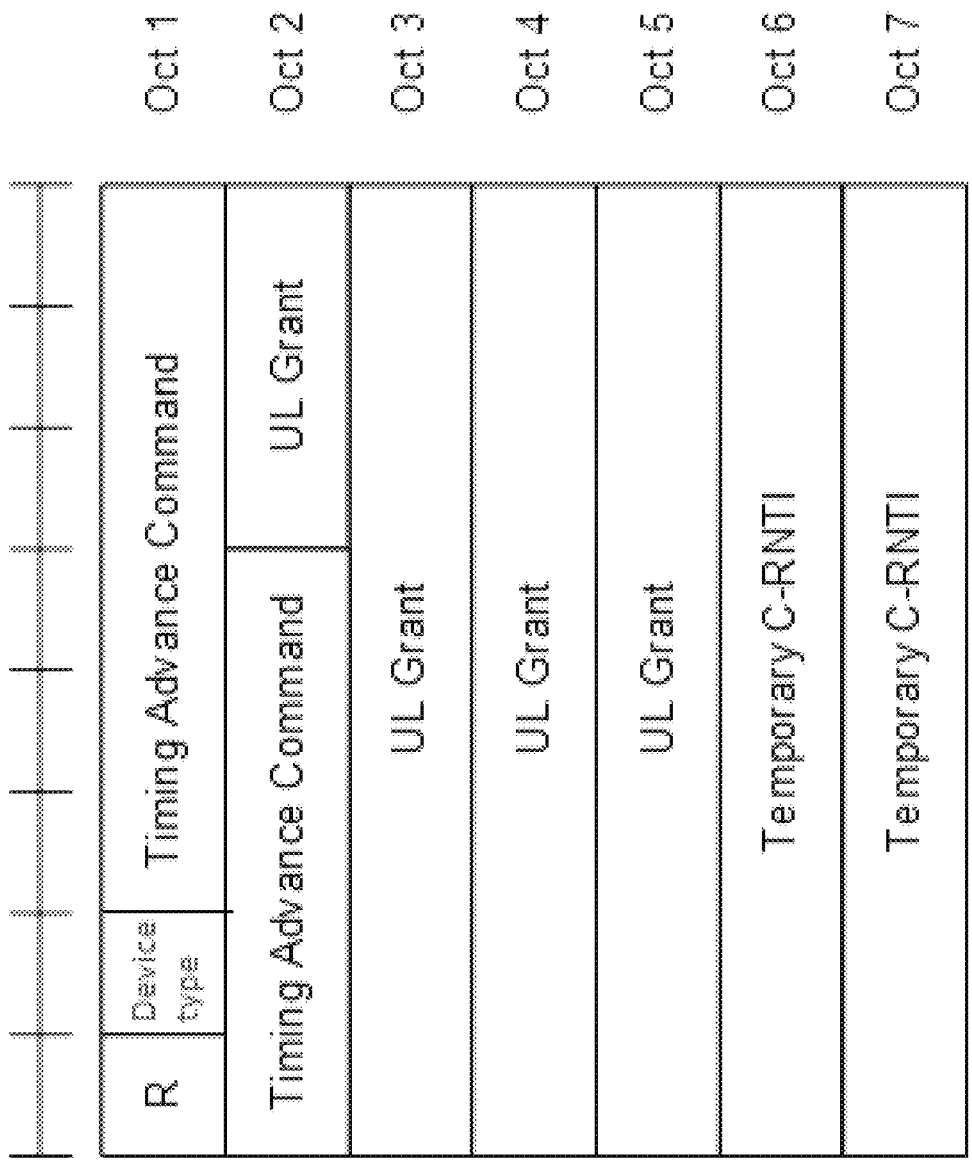
FIG. 7 illustrates another modified MAC RAR in accordance with some aspects.

In another option, when ChannelAccessMode-r16='semistatic', whether or not a UE is able to operate as an initiating device when transmitting HARQ-ACK information of MsgB for the 2-step RACH procedure is indicated through 1 bit using a part of "timing advanced command". In this case, the bit for "timing advanced command" may be repurposed as "Device type" and bit '0' may indicate that UE is able to operate as an initiating device and bit "l" may indicate that UE is not able to operate as an initiating device (or vice versa). FIG. 7 illustrates another modified MAC RAR in accordance with some aspects. FIG. 7 illustrates another modified MAC RAR with one bit of the field "Timing advance commend"" reassigned as "Device type". In this case, the total number of bits for "liming advanced command" is reduced from 12 to 11 bits. This is again based on the assumption that a URLLC operating in the unlicensed spectrum may not be undertaken for a very large cell scenario and a large TA may thus not be used.

The embodiments/options above are not mutually exclusive, and one or more of them may apply together.

In some embodiments, to distinguish a Rel.16 UE from a Rel.17 UE, where the feature of UE's initiated COT is enabled, the PRACH preambles are partitioned. In other words, a set of preambles are used by Rel.16 UE, while the remaining set is used by the Rel.17 UEs.

In some embodiments, to distinguish a Rel.16 UE from a Rel.17 UE, where the feature of UE's initiated COT is enabled, following the PRACH transmission containing MsgA for the 2 step-RACH procedure, a UE may transmit a PUSCH transmission in which a UCI may be piggybacked. The UCI may contain an explicit indication of the UE's capabilities. In one example, this information could be carried by a CG-UCI when this is piggybacked in the PUSCH, by configuring an invalid set of bits. For example, the invalid set of bits may be configured by indicating that the UE may perform COT sharing with an invalid length of the COT, which may be longer than the maximum COT itself.

In some embodiments, if the gNB is not able to distinguish the release of the UE (i.e., Rel-16 or Rel-17), the gNB may not signal the UE to act as an initiating device for Msg3 retransmissions and/or for retransmitting HARQ-ACK information of MsgB if the gNB fails to receive the first Msg3 transmission and/or the first HARQ-ACK information of MsgB.

In some embodiments, a UE is allowed to perform a transmission of Mgs3 and/or the transmission of the HARQ-feedback information related to the MsgB transmission within its own FFP. In this case, the transmission may be considered invalid if the transmission lies wholly within or partially overlaps with the UE's idle period and/or the idle period of the serving gNB. As above, this embodiment is not mutually exclusive with some of those disclosed above, and they can be applied together with this embodiment.

Figure 8:
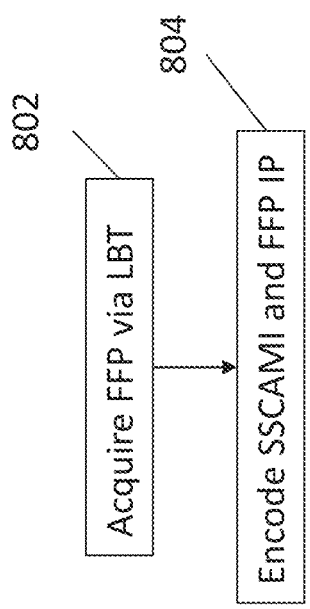
FIG. 8 illustrates a flowchart of sending indicators in accordance with some aspects.

FIG. 8 illustrates a flowchart of sending indicators in accordance with some aspects. FIG. 8 may be implemented by a gNB in some embodiments. For example, the process may include, at operation 802, acquiring a FFP via a CAT-2 LBT procedure. At operation 804, the gNB may encode a message for transmission to a UE that includes a semi-static channel access mode indicator and an indication of an idle period associated with the FFP for the gNB.

Figure 9:
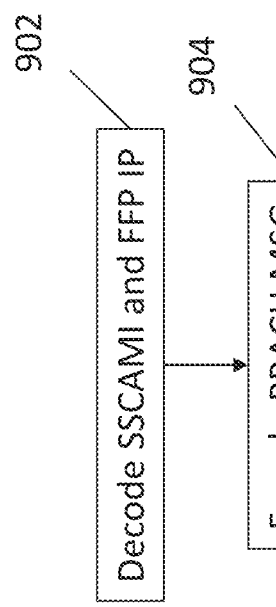
FIG. 9 illustrates a flowchart of a random access procedure in accordance with some aspects.

FIG. 9 illustrates a flowchart of a random access procedure in accordance with some aspects. FIG. 9 may be implemented by a UE in some embodiments. In this example, the process includes, at operation 902, receiving a message that includes a semi-static channel access mode indicator and an indication of an idle period associated with a FFP from a gNB. At 904, in response to the semi-static channel access mode indicator, the UE may encode a PRACH message for transmission to the gNB within an FFP associated with the UE based on a determination that transmission of the PRACH message does not overlap with the idle period associated with the FFP for the gNB.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, % with each claim standing on its own as a separate embodiment.

What is claimed is:

1. An apparatus for a user equipment (UE), the apparatus comprising:
    processing circuitry to configure the UE to:
        receive, from a $5^{th}$ generation NodeB (gNB), a control signal that contains an indication that the UE is able to operate as an initiating device in idle or inactive mode for Ultra-Reliable Low-Latency Communication (URLLC) in a sub-6 GHZ Unlicensed Spectrum, the control signal comprising at least one of a system information block1 (SIB1) or radio resource control (RRC) signaling;
        after reception of the control signal, transmit a physical random access channel (PRACH) message within a Fixed Frame Period (FFP) of the UE; and
        transmit Msg 3 after a determination that the control signal comprises a ChannelAccessMode-r16='semistatic' parameter and 'allowDeviceTypeInRar-r17'='true' parameter; and
    a memory configured to store the indication.

2. The apparatus of claim 1, wherein the processing circuitry further configures the UE to:
    determine, prior to transmission of the PRACH message, whether the transmission of the PRACH message is to overlap with an idle period of an FFP of the gNB; and
    transmit the PRACH message after a determination that the transmission of the PRACH message does not overlap with the idle period of the FFP of the gNB.

3. The apparatus of claim 2, wherein the processing circuitry is further configured to:
    determine, prior to transmission of the PRACH message, whether the transmission of the PRACH message is within an invalid FFP of the gNB by blind presence detection within at least one time instance within an FFP of the gNB; and
    transmit the PRACH message after a determination that the transmission of the PRACH message is within the invalid FFP of the gNB.

4. The apparatus of claim 2, wherein the processing circuitry further configures the UE to transmit to the gNB, a Msg1 or MsgA transmission as if the UE is the initiating device as long as:
    the Msg1 or MsgA transmission lies within the idle period of the FFP of the gNB and does not overlap with a last 16 or 25 µs of the idle period of the FFP of the gNB, or
    the Msg1 or MsgA transmission lies outside of the idle period of the UE.

5. The apparatus of claim 2, wherein the processing circuitry further configures the UE to:
    receive, an indication in a Random Access Response (RAR) from the gNB, that the transmission of Msg 3 does not overlap with the idle period of the FFP of the gNB based on the RAR; and
    transmit the PRACH message in response to the indication.

6. The apparatus of claim 1, wherein the processing circuitry further configures the UE to:
    determine, based on an indication in a Random Access Response (RAR) from the gNB, whether the UE is permitted to operate as an initiating device to transmit Msg3 over the FFP of the UE; and
    in response to a determination that the UE is permitted to operate as an initiating device, perform a contention channel assessment (CCA) procedure and initiate the FFP of the UE.

7. The apparatus of claim 6, wherein:
the indication is an RAR uplink (UL) grant field that at least one of repurposes an unused existing field of the RAR or adds a new field, and at least one of:
the unused existing field includes at least one of:
  a "CSI request" field that has a first "CSI request" value for operation with shared spectrum channel access when ChannelAccessMode-r16='semistatic' and a second "CSI request" value otherwise, or
  a "Frequency hopping flag" field that has a first "Frequency hopping flag" value for operation with shared spectrum channel access when ChannelAccessMode-r16='semistatic' and a second "Frequency hopping flag" value otherwise, or
the new field includes at least one of:
  a "DeviceType" field that has a first "DeviceType" value for operation with shared spectrum channel access when ChannelAccessMode-r16='semistatic' and a second "DeviceType" value otherwise.

8. The apparatus of claim 7, wherein the processing circuitry further configures the UE to re-interpret the unused existing field based on reception of a RRC parameter 'allowDeviceTypeInRar-r17' in response to ChannelAccessMode-r16='semistatic' and 'allowDeviceTypeInRar-r17'='true'.

9. The apparatus of claim 6, wherein:
the indication is an RAR uplink (UL) grant field that repurposes one or two unused bits of an existing field of the RAR, and
the existing field includes at least one of: "PUSCH time resource allocation", "MCS", or "TPC command for PUSCH".

10. The apparatus of claim 6, wherein:
the indication is provided in a Medium Access Control (MAC) RAR payload, and
the indication is provided in at least one of:
  a 1 bit reserved field in a first bit of a first octet of the MAC RAR payload, or
  a repurposed bit in a "Timing Advance Command" field of the MAC RAR payload.

11. The apparatus of claim 1, the processing circuitry further configures the UE to:
determine, based on an indication in a MsgB transmission from the gNB, whether the UE is permitted to operate as an initiating device to transmit Hybrid Automatic Repeat Request (HARQ)-feedback information related to the MsgB transmission over the FFP of the UE; and
in response to a determination that the UE is permitted to operate as an initiating device, perform a contention channel assessment (CCA) procedure and initiate the FFP of the UE.

12. The apparatus of claim 1, wherein the processing circuitry further configures the UE to:
determine, based on an indication in a 1 bit reserved field in a first bit of a seventh octet of a MAC successRAR payload from the gNB, whether the UE is permitted to operate as an initiating device to transmit Hybrid Automatic Repeat Request (HARQ)-feedback information related to a MsgB transmission over the FFP of the UE; and
in response to a determination that the UE is permitted to operate as an initiating device, perform a contention channel assessment (CCA) procedure and initiate the FFP of the UE.

13. The apparatus of claim 1, wherein:
the processing circuitry further configures the UE to:
  determine, based on an indication in a MAC fallbackRAR payload from the gNB, whether the UE is permitted to operate as an initiating device to transmit Hybrid Automatic Repeat Request (HARQ)-feedback information related to a MsgB transmission over the FFP of the UE; and
  in response to a determination that the UE is permitted to operate as an initiating device, perform a contention channel assessment (CCA) procedure and initiate the FFP of the UE; and
the indication is provided in at least one of:
  a 1 bit reserved field in a first bit of a first octet of the MAC fallbackRAR payload, or
  a repurposed bit in a "Timing Advance Command" field of the MAC fallbackRAR payload.

14. The apparatus of claim 1, wherein:
PRACH preambles are segregated into at least sets of PRACH preambles for Release 16 UEs and for Release 17 UEs, and
the processing circuitry further configures the UE to select a PRACH preamble from one of the sets of PRACH preambles to indicate a release of the UE to the gNB.

15. The apparatus of claim 1, wherein:
in response to reception of a msgA transmission from the gNB, the processing circuitry further configures the UE to transmit to the gNB, a physical uplink shared channel (PUSCH) transmission, and
the PUSCH transmission includes uplink control information (UCI) that contains an indication of UE capabilities to indicate a release of the UE to the gNB.

16. An apparatus for a $5^{th}$ generation NodeB (gNB), the apparatus comprising:
processing circuitry to configure the gNB to:
  transmit to a user equipment (UE), a control signal that contains an indication that the UE is able to operate as an initiating device in idle or inactive mode for Ultra-Reliable Low-Latency Communication (URLLC) in a sub-6 GHZ Unlicensed Spectrum, the control signal comprising at least one of a system information block1 (SIB1) or radio resource control (RRC) signaling;
  after transmission of the control signal, receive a physical random access channel (PRACH) message from the UE within a Fixed Frame Period (FFP) of the UE; and
  receive Msg 3 after a determination that the control signal comprises a ChannelAccessMode-r16='semistatic' parameter and 'allowDeviceTypeInRar-r17'='true' parameter; and
a memory configured to store the indication.

17. The apparatus of claim 16, wherein the PRACH message is received in response to a condition selected from a set of conditions that include:
the PRACH message does not overlap with an idle period of an FFP of the gNB,
the PRACH message does not overlap with the idle period of the FFP of the gNB and a Random Access Response (RAR) from the gNB contains an indication that the PRACH message does not overlap with the idle period of the FFP of the gNB,
the PRACH message does not overlap with the idle period of the FFP of the gNB and transmission of the PRACH message is within an invalid FFP of the gNB, and
the PRACH message does not overlap with the idle period of the FFP of the gNB, transmission of the PRACH message is within an invalid FFP of the gNB, and the RAR contains the indication that the PRACH message does not overlap with the idle period of the FFP of the gNB.

18. A non-transitory computer-readable storage medium that stores instructions for execution by one or more processors of a user equipment (UE), the one or more processors to configure the UE to, when the instructions are executed:

receive, from a 5$^{th}$ generation NodeB (gNB), a control signal that contains an indication that the UE is able to operate as an initiating device in idle or inactive mode for Ultra-Reliable Low-Latency Communication (URLLC) in a sub-6 GHZ Unlicensed Spectrum, the control signal comprising at least one of a system information block1 (SIB1) or radio resource control (RRC) signaling;

after reception of the control signal, transmit a physical random access channel (PRACH) message within a Fixed Frame Period (FFP) of the UE; and transmit Msg 3 after a determination that the control signal comprises a ChannelAccessMode-r16='semistatic' parameter and 'allowDeviceTypeIn-Rar-r17'='true' parameter.

19. The medium of claim 18, wherein the instructions, when executed, further cause the one or more processors to configure the UE to:

determine, prior to transmission of the PRACH message, whether the transmission of the PRACH message is to overlap with an idle period of an FFP of the gNB or of the UE; and transmit the PRACH message after a determination that the transmission of the PRACH message does not overlap with the idle period of the FFP of the gNB or of the UE.

* * * * *